United States Patent
Kanzow et al.

(10) Patent No.: US 8,951,096 B2
(45) Date of Patent: Feb. 10, 2015

(54) METHOD FOR MACHINING FLAT WORKPIECES

(75) Inventors: Jörn Kanzow, Kiel (DE); Sebastian Jessen, Dänischenhagen (DE); Eckehard Gurgel, Büdelsdorf (DE); Ingo Grotkopp, Kiel (DE)

(73) Assignee: Peter Wolters GmbH, Rendsburg (DE)

( * ) Notice: Subject to any disclaimer, the term of this patent is extended or adjusted under 35 U.S.C. 154(b) by 142 days.

(21) Appl. No.: 13/376,461

(22) PCT Filed: May 18, 2010

(86) PCT No.: PCT/EP2010/003028
§ 371 (c)(1),
(2), (4) Date: Mar. 7, 2012

(87) PCT Pub. No.: WO2010/139397
PCT Pub. Date: Dec. 9, 2010

(65) Prior Publication Data
US 2012/0164919 A1    Jun. 28, 2012

(30) Foreign Application Priority Data
Jun. 6, 2009  (DE) .......................... 10 2009 024 125

(51) Int. Cl.
*B24B 37/08*   (2012.01)

(52) U.S. Cl.
USPC ....... 451/5; 451/9; 451/41; 451/267; 451/269

(58) Field of Classification Search
USPC ......... 451/5, 8, 9, 41, 57, 262, 267, 268, 269, 451/285, 287, 288
See application file for complete search history.

(56) References Cited

U.S. PATENT DOCUMENTS

| | | | |
|---|---|---|---|
| 4,272,924 A * | 6/1981 | Masuko et al. ................. 451/1 |
| 4,443,516 A | 4/1984 | Rogers | |
| 5,969,521 A * | 10/1999 | Kurita et al. ................. 324/229 |
| 6,652,358 B1 * | 11/2003 | Ikeda et al. ....................... 451/8 |
| 7,137,867 B2 * | 11/2006 | Nagayama et al. .............. 451/5 |
| 7,147,541 B2 * | 12/2006 | Nagayama et al. .............. 451/5 |
| 7,815,489 B2 * | 10/2010 | Pietsch et al. .................... 451/7 |
| 7,930,058 B2 * | 4/2011 | Bhagavat et al. ............ 700/164 |
| 7,963,823 B2 | 6/2011 | Fischer | |
| 8,113,913 B2 * | 2/2012 | Pietsch et al. .................... 451/7 |
| 2006/0009125 A1 * | 1/2006 | Okura .............................. 451/5 |
| 2006/0194511 A1 | 8/2006 | Nagayama et al. | |
| 2008/0014839 A1 * | 1/2008 | Pietsch et al. .................. 451/41 |

FOREIGN PATENT DOCUMENTS

| | | | |
|---|---|---|---|
| DE | 10 2004 040 429 A1 | 2/2006 | |
| DE | 10 2006 037 490 A1 | 2/2008 | |
| DE | 10 2007 056 627 A1 | 9/2008 | |
| EP | 1 970 159 A1 | 9/2008 | |
| JP | 10034529 A * | 2/1998 | ............. B24B 37/04 |
| JP | 10202514 A * | 8/1998 | ............. B24B 37/04 |
| JP | 2002-046062 A | 2/2002 | |
| JP | 2003-249819 A | 9/2003 | |
| JP | 2008-221460 A | 9/2008 | |

* cited by examiner

*Primary Examiner* — Eileen P. Morgan
(74) *Attorney, Agent, or Firm* — Vidas, Arrett & Steinkraus, P.A.

(57) ABSTRACT

The invention relates to a method for machining flat workpieces in a double-sided machining tool, which has an upper and a lower work disk, wherein at least one of the work disks is rotatingly driven and the work disks each have an annular work surface, wherein the work surfaces amongst themselves limit an also annular work gap, in which at least one carrier is located, which guides at least one workpiece in the work gap, so that the at least one workpiece is machined in a double-sided manner between the work surfaces. The distance between the work disks is measured at at least two radially spaced measurement locations of the work gap and in that, from the measured distances, a distance between the work disks is determined at a location of the work gap representing the thickness of the at least one workpiece machined in the work gap.

13 Claims, 3 Drawing Sheets

METHOD FOR MACHINING FLAT WORKPIECES

CROSS-REFERENCE TO RELATED APPLICATIONS

This application is a national stage of application no. PCT/EP2010/003028 filed May 18, 2010.

STATEMENT REGARDING FEDERALLY SPONSORED RESEARCH

Not applicable.

BACKGROUND OF THE INVENTION

The invention relates to a method for machining flat workpieces in a double-sided machining tool, which has an upper and a lower work disk, wherein at least one of the work disks is rotatingly driven and the work disks each have an annular work surface, wherein the work surfaces amongst themselves limit an also annular work gap, in which at least one carrier is located, which guides at least one workpiece in the work gap, so that the at least one workpiece is machined in a double-sided manner between the work surfaces. For example, semiconductor wafers are machined, e.g. ground or polished in a double-sided manner with such machining tools. It is thereby decisive that the material removal is ended precisely at the desired point in time or respectively upon reaching a predetermined workpiece thickness. On one hand, a large number of workpieces should be produced with a smallest possible thickness deviation. On the other hand, the quality of the machined workpieces and the economic efficiency of the processes depend, in particular in the case of double-sided polishing, sensitively on the thickness of the machined workpiece in relation to the carrier receiving the workpiece. It can thereby be preferred to end the machining process if the workpiece is a few micrometers thicker than the carrier, for example a rotor disk. In this manner, abrasion and thus premature wear of the carrier are avoided. On the other hand, it can be preferred to machine the workpieces as precisely as possible to the same thickness as the carrier. This leads to an advantageous thickness distribution over the surface of the workpiece. It can finally be desired to further continue the machining process, for example a polishing process and to work, for example polish, slightly into the surface of the carrier. In this manner, an optimal local evenness, in particular in the edge area of the wafer, is achieved. The disadvantage of the two latter procedures is certainly an increased wear of the carrier, for example rotor disks, since they come in contact with the work coatings of the work surfaces. There is often only a difference in the thickness of the workpieces of 5-10 μm between the three possible named procedures. Against this background, it is absolutely necessary to end the machining of the workpieces precisely at the right time in order to reproducibly produce workpieces with the desired quality.

Solutions for measuring workpiece thicknesses are already known from the state of the art. U.S. Pat. No. 4,433,510 A thus describes the measurement of the distance between the work disks with an eddy current sensor. In order to avoid measurement errors caused by unevenness or incomplete parallel alignment of the work disks, the distance measurement thereby takes place only at certain times when the work disks are located in the same angle position with respect to each other. U.S. Pat. No. 5,969,521 A discloses an apparatus with at least two eddy current sensors, wherein it is ensured through the arrangement of the sensors with respect to each other that one of the sensors has a "free view" of the opposite work disk when the other sensor detects the presence of a rotor disk. Measurement errors caused by the rotor disks should be avoided in this manner. U.S. Pat. No. 7,147,541 A describes an apparatus for the thickness measurement of workpieces during double-sided machining with an eddy current sensor, which measures the distance of a work disk to the surface of a rotor disk. Work coating wear should thereby be compensated mathematically. Moreover, DE 10 2004 040 429 A1 describes a double-sided polishing machine that measures the distance between polishing disks at least two radially spaced points of the polishing gap. Based on this measurement, an undesired deformation of the work gap is detected and counteracted if necessary. An apparatus for influencing the work gap geometry, with which at least one of the work disks can be deformed concavely or convexly, is also known from DE 10 2006 037 490 A1.

The known methods for determining workpiece thickness often do not provide the required accuracy. In particular, measurement errors and thus inaccurate thickness determinations result from deviations in the gap geometry from the plane parallelism that are unavoidable or consciously brought about during operation.

Starting from the explained state of the art, the object of the invention is to provide a method of the initially named type with which workpieces can be machined more precisely up to a predetermined thickness.

BRIEF SUMMARY OF THE INVENTION

For a method of the initially named type, the object is achieved by the invention in that the distance between the work disks is measured at least two radially spaced measurement locations of the work gap and in that, from the measured distances, a distance between the work disks is determined at a location of the work gap representing the thickness of the at least one workpiece machined in the work gap, for example a location of the work gap in turn radially spaced from the measurement locations, and the thickness of the at least one workpiece machined in the work gap is determined from the distance determined in this manner. The work surfaces of the work disks are formed by their surfaces facing the work gap. The distance between the work disks is thus in particular the distance between their work surfaces. The double-sided machining according to the invention can be e.g. grinding, lapping, honing or polishing. The workpieces can be e.g. semiconductor wafers. In particular, a plurality of workpieces can be machined simultaneously in the work gap. The workpiece thickness, which is determined according to the invention, is the momentary workpiece thickness during machining. In particular, the workpiece thickness can be concretely determined, in particular calculated, from the distance between the work disks determined from measured distances. The determined distance can thus be taken directly as the workpiece thickness, if applicable by subtracting a work coating thickness. But it is also possible to determine just one turn-off time for the machining, without thereby concretely determining the workpiece thickness. It is thus only determined in the case of a certain distance determined according to the invention from the measured distances that the desired workpiece thickness is now present and the machining is ended. Based on the conclusion according to the invention about the workpiece thickness, the turn-off time for the machining is thus determined so that the workpieces have precisely the predetermined thickness after the machining.

According to the invention, for the first time, measurement signals from at least two distance sensors are combined in order to determine the distance at a certain, in particular additional, location of the work gap and to determine from this a workpiece thickness or a turn-off time for the machining. In particular, the distance between the work disks can be calculated at any radial position from the measurement signals of two measurement sensors arranged radially spaced and used for the determination of the turn-off time for the machining or for calculation of the actual workpiece thickness. This is explained in greater detail below, wherein the following definitions are used:

$R_i$: Radius of the inner work disk or respectively work surface edge
$R_a$: Radius of the outer work disk or respectively work surface edge
$R_m$: Average value from $R_i$ and $R_a$ (average radius of the work disk)
$R_1$: Radial position of the first (inner) sensor
$R_2$: Radial position of a second (outer) sensor
$R_s$: Radius, at which a change in the gap geometry causes no distance change
$D_i$: Distance between the work surfaces of the work disks at $R_i$
$D_a$: Distance between the work surfaces of the work disks at $R_a$
$D_m$: Distance between the work surfaces of the work disks at $R_m$
$D_1$: Distance between the work surfaces of the work disks at the location of a first distance sensor
$D_2$: Distance between the work surfaces of the work disks at the location of a second distance sensor
$\Delta D_1$: Change in the distance between the work surfaces of the work disks at the location of the first sensor
$\Delta D_2$: Change in the distance between the work surfaces of the work disks at the location of the second sensor
$D(R)$: Disk distance at any radial position R.

The radii relate to the center of the annular work gap, which usually lies on the rotational axis of the at least one rotatingly driven work disk. As vectors, the radii each specify a radial position. The distance measurement and thus the distance between the work surfaces of the work disks thereby also takes into account (indirectly) a possible provided work coating, since it influences the measured distance between the work surfaces of the work disks. Assuming that the work disk surfaces correspond with a line in the radial direction, the distance between the two work disks can be calculated at any radial position from the measurement signals of two radially spaced distance sensors with the following equation:

$$D(R) = D_1 + (R - R_1) * \frac{D_2 - D_1}{R_2 - R_1} \quad \text{Eq. 1}$$

Through the combination according to the invention of two radially distributed sensor signals, it is possible when determining the workpiece thickness to detect and compensate for errors caused by a non-parallel work gap. The invention is based on the knowledge that a workpiece thickness cannot be determined reliably with one single distance sensor since the work gap during operation almost always deviates from the parallelism, regardless whether or not this is desired. Different distance measurement values thus always result in the radial direction. Through the linking according to the invention of the values measured by radially spaced distance sensors, the actual workpiece thickness can in contrast also be determined precisely for a non-parallel work gap. In particular, a work disk distance characteristic for the workpiece thickness also in the case of a changed gap geometry or respectively a characteristic gap width and thus the actual workpiece thickness can be determined from the measured distance values. The quality of the workpiece machining is thereby increased according to the invention.

According to one embodiment, the distance between the work disks at a location on the inner and outer edge of the work gap can be determined from the measured distances and the thickness of the at least one workpiece machined in the work gap can be determined from the thus determined distance value. This embodiment is based on the assumption that the smallest gap width occurs either on the inner or on the outer edge of the work disks and it represents the actual momentary workpiece thickness since the workpiece must regularly pass this narrowest area of the work gap during its machining and, as a result, cannot be thicker. It is thereby also possible to determine both the distance on the inner edge of the work disk as well as on the outer edge of the work disk and take the smaller of the thus determined values for the distance value representing the workpiece thickness. The distance of the work disks on the inner or respectively outer edge of the work gap is calculated according to the following equations:

$$D_i = D(R_1) = D_1 + (R_1 - R_1) * \frac{D_2 - D_1}{R_2 - R_1} \quad \text{Eq. 2}$$

$$D_a = D(R_a) = D_1 + (R_a - R_1) * \frac{D_2 - D_1}{R_2 - R_1} \quad \text{Eq. 3}$$

In accordance with another embodiment, the distance between the work disks can be determined from the measured distances at a location, the radius of which corresponds with the average value of the radius of the inner edge of the work gap and the outer edge of the work gap and the thickness of the at least one workpiece machined in the work gap can be determined from the thus determined distance. In this embodiment, a distance value representing the workpiece thickness is for example calculated through the following equation:

$$D_m = D(R_m) = D_1 + \left(\frac{R_i + R_a}{2} - R_1\right) * \frac{D_2 - D_1}{R_2 - R_1} \quad \text{Eq. 4}$$

This embodiment is based on the knowledge that the workpiece thickness neither corresponds with the gap width on the inner nor on the other edge of the work gap, but rather based on a certain flexibility of the work coating, for example a polishing cloth, and thus of a compression of the work coating by the workpiece and a movement of the workpiece over the entire width of the work disks corresponds with the disk distance at the location of the average work disk radius.

According to a further embodiment, it can be provided that the work surface of at least one of the work disks can be adjusted into a convex or a concave shape and the distance between the work disks is determined from the measured distances at a location where the distance between the work disks does not change during an adjustment of the at least one work disk into a convex or a concave shape and the thickness of the at least one workpiece machined in the work gap can be determined from the thus determined distance. In the case of this embodiment, at least one of the work disks can be adjusted such that its work surface assumes a slightly concave or convex shape and the gap geometry deviates accordingly from the plane parallelism. A suitable adjustment device can be provided for this, as is known for example from DE 10

2006 037 490 A1. This embodiment is based on the knowledge that a more or less strong deformation of the work disks and thus a change in the gap geometry arises during each machining due to the introduced process heat. This results in turn in changes in the measured distance values in the course of machining, which are not solely attributable to the reduction in the workpiece thickness due to the abrasive machining process. Thus, in the case of this embodiment, precisely the distance at the radial location where such a change in the gap geometry causes no distance change is determined. This location thus concerns the rotational point or respectively pivot point of a desired or undesired deformation of the work surfaces. This embodiment permits an even more precise determination of the workpiece thickness, wherein the radius at which the distance value to be determined exists depends on the individual machining tool and the respective machining parameters. The radius for which the distance change during a change in the gap geometry is zero does thereby not need to lie in the middle of the annular work gap. It can be determined in advance in the course of a calibration of the machining tool with a corresponding adjustment device for the work gap. It was thus observed that a change in the gap geometry leads to a characteristic change in the measurement values of two radially spaced distance sensors. Accordingly, it can be provided according to a further embodiment that the location where the distance between the work disks does not change during an adjustment of the at least one work disk into a concave or a convex shape is determined in that the at least one work disk is adjusted into a concave and/or a convex shape, a change in the distance of the work disks at the measurement locations is thereby measured and from this the radius of the location is determined at which the distance between the work disks does not change during an adjustment of the at least one work disk. If the distance changes occurring during a defined adjustment of the work gap at the two radially spaced measurement locations were determined through measurement, the radius for which the distance change during a change in the gap geometry is equal to zero can be calculated with the following equation:

$$R_s = \frac{\Delta D_2 * R_1 + \Delta D_1 * R_2}{\Delta D_1 + \Delta D_2} \quad \text{Eq. 5}$$

The distance value representing the workpiece thickness can then be calculated from the distance of the work disks at the radius $R_s$:

$$D_s = D(R_s) = D_1 + (D_2 - D_1) * \frac{\Delta D}{\Delta D_1 + \Delta D_2} \quad \text{Eq. 6}$$

According to another embodiment, a distance between the work disks can be determined from the measured distances at a plurality of locations radially spaced from the measurement locations, the thus determined distances are weighted with a variable representing the radial probability of presence of the workpieces at the locations assigned to the determined distances in the course of their machining in the work gap and the workpiece thickness is determined from the average value of the weighted distances. The determined distance locations can be distributed evenly over the work gap in the radial direction. In this embodiment, the respectively resulting work disk distance is calculated from the measured distance values initially for several different radii. The average radial probability of presence of the workpieces in the work gap is then taken into consideration. The workpieces move through the work gap in the course of their machining. Depending on the specific design and geometry of the machine, such as workpiece size, work gap size, etc., and the machining parameters, such as rotational speed of the work disk(s) and carriers, the workpieces stay at different locations of the work gap with different frequency. A detailed description of the radial probability of presence and its calculation can be found in T. Ardelt "Einfluss der Relativbewegung auf den Prozess and das Arbeitsergebnis beim Planschleifen mit Planetenkinetik" (Influence of the Relative Movement on the Process and the Work Result during Surface Grinding with Planetary Kinetics), ISBN 3-8167-5609-3 (T. Ardelt). In this embodiment, the distance values determined at different radii are thus weighted with the average radial probability of presence at the corresponding radii or respectively according to T. Ardelt with the applied path length distribution defined there. The actual workpiece thickness can then be determined as an arithmetic mean of all weighted radial disk distances. This embodiment of the invention is based on the assumption that the workpiece thickness corresponds with the work disk distances rather at such locations where the workpieces stay most frequently during their machining.

In accordance with another embodiment, the method according to the invention can be performed repeatedly, a temporal characteristic of the workpiece thickness can be recorded and an end time can be determined for the workpiece machining from the temporal characteristic. The turn-off time for the machining can then be precisely determined for example from the temporal characteristic of the distance values determined as the workpiece thickness. Due to the increased precision according to the invention and the lower error-susceptibility, it is possible to make conclusions on the processes in the work gap during the machining from the characteristic of the temporal curve of the workpiece thickness. Mainly two stable operating states can thereby be observed. The first operating state is characterized by a largely even material removal and a corresponding, constant thinning of the workpieces. This operating state shows itself in the characteristic of the curve as a line with a (negative) slope determined through the removal rate. The second operating state is achieved mainly when no further material removal of the workpieces takes place since they have reached the thickness of the carrier or rotor disks receiving them. This range shows itself in the temporal characteristic accordingly as a line with the slope zero. Of particular interest is the transition between these two operating states. Depending on the selected machining strategy, the machining can be ended in this transition area. Accordingly, it can be provided according to another embodiment that the end time is determined as the time when the first mathematical derivation of the recorded temporal characteristic changes by more than a predetermined threshold value. The mathematical derivation of the characteristic changes precisely at the transition between the two described operating states. Of course, the thereby predetermined threshold value can also be zero. But it will usually assume a value other than zero. Thus, the mathematical derivation also changes slightly already before the transition between the two operating states in the framework of a normal measurement and/or machining fluctuation. In order ignore such a slight change, the threshold value is predetermined. Through suitable selection of the threshold value, for example the time when the reduction rate starts to decline significantly can already be taken as the reference point for ending the machining. However, it is also conceivable to continue the machining for a certain time past the reaching of the reference point in order to design the workpieces with a smaller thickness. The evenness of the workpiece surfaces is optimized in this manner. Accordingly, the end time can be determined as a time, which occurs a certain period of time after the time when the first derivation of the recorded temporal characteristic changes by more than the predetermined threshold value. The duration of the process continuation after the significant change in the first derivation decides the thickness of the workpieces after machining.

The work surfaces of the work disks normally have a work coating, e.g. a polish coating (a polish cloth or pad) or the like. The thickness of the work coatings should be taken into account accordingly during the determination of the workpiece thickness, e.g. in that it is subtracted from the distance value calculated from the measured distance values. However, the thickness of the work coatings constantly changes depending on wear. Since, in the aforementioned embodiment, the determination of the end time of the machining takes place via the thickness of the carrier receiving the workpieces, for example the rotor disks, this type of process control is dependent on the thickness of the used work coatings on the work disks and is in this respect also insensitive with respect to a reduction of the work coating thickness due to wear. Complicated calibration processes to account for such wear, such as provided in the state of the art, are thus not required. From the series of individual measurement values of the distance measurement system, the respective end point can be determined through numeric processes.

According to another embodiment, it can be provided that the distance measurement takes place at the measurement locations in that the distance at the respective measurement location is measured multiple times during one or more revolutions of the at least one rotatingly driven work disk and a parameter is determined from the measurement characteristic and this parameter is compared with a reference parameter. Naturally, the measurement of the distances can thereby also take place continuously. The parameter can be for example the average value of the characteristic of the measured distance values. The state of the art assumes that a fluctuation in a measurement signal of a distance sensor integrated into one of the work disks, for example of an eddy current sensor, is caused during the rotation of the work disks through mechanical inaccuracies in the disks. Based on this, the state of the art suggests only measuring the distance in the short term and periodically at a certain position of the work disks. However, examinations by the applicant have surprisingly shown that the fluctuations in the sensor signal cannot be explained solely by mechanical inaccuracies. Rather, the signal fluctuations are a multiple of that which is explainable with other measurement methods through mechanical changes in the work gap. The explanation should rather be seen in that an eddy current sensor always records electromagnetic properties of the material that it is measuring. The sensor signal of such a sensor is thus influenced on one hand by the distance and on the other hand by electromagnetic properties of the work disk, which fluctuate slightly for example through production tolerances. If a work disk is turned accordingly under such an eddy current sensor, on the thereby detected circular path the sensor measures a signal characteristic, which is characteristic for each disk and can be called a so-called "magnetic fingerprint". This magnetic fingerprint superimposes the measurement signal. This problem is not solved in the state of the art. In particular, fluctuations by the magnetic fingerprint are of such a high frequency that they can lead to significant amplitude changes in the measurement signal in the range of a few millimeters. A measurement in certain angle positions of the work disk, as suggested in the state of the art, cannot deliver such accuracies. According to this embodiment, the invention thus suggests recording the magnetic fingerprint for example during a calibration of the double-sided machining tool for one or more work disk revolutions and calculating from it a parameter, for example the average value, as the reference parameter. During a subsequent machining process, a distance measurement signal is also recorded for respectively one or more disk revolutions and a parameter, for example the average value, is in turn calculated from it. The sought distance value can then be determined from the difference between the current parameter and the reference parameter. Since the measurement is thus determined through the duration (of one or more disk revolutions) and no longer through the location (position of the disks with respect to each other), it can be controlled by the speed sensor already existing in such machines in connection with a time measurement. Additional angle transmitters are not required. The advantages of this embodiment are generally naturally also realized in the case of a distance measurement at only one radial location of the work gap. However, further improvement in the measurement accuracy is achieved with the two radially spaced measurement locations according to the invention.

According to another particularly practical embodiment, the at least one carrier can be at least one rotor disk, which has at least one recess, in which the at least one workpiece to be machined is received, and which is rotating by means of a roller device, for example a geared ring arrangement, whereby the at least one workpiece received in the rotor disk moves along a cycloid path in the work gap. Particularly precise workpiece machine is possible with such known rotor disks.

In a further particularly practical embodiment, the distance between the work disks can be measured with at least two eddy current sensors arranged at radially spaced measurement locations of the work gap in one of the work disks. Such sensors provide reliable distance measurements and are often already provided in double-sided machining tools for other purposes, in particular the controlling of a plane-parallel gap.

BRIEF DESCRIPTION OF THE SEVERAL VIEWS OF THE DRAWINGS

One exemplary embodiment of the invention is explained below in greater detail using figures. The drawing shows schematically in.

DETAILED DESCRIPTION OF THE INVENTION

Figure 1:
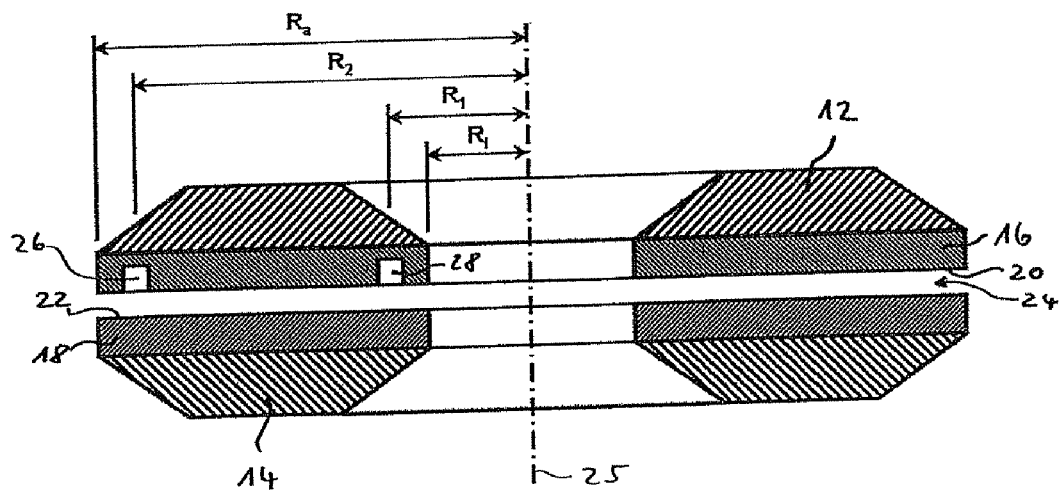
FIG. 1 a section of a double-sided machining tool for performing the method according to the invention in a vertical section view.

While this invention may be embodied in many different forms, there are described in detail herein a specific preferred embodiment of the invention. This description is an exemplification of the principles of the invention and is not intended to limit the invention to the particular embodiment illustrated If not specified otherwise, the same reference numbers are used for the same objects in the figures. FIG. 1 shows part of a double-sided machining, in the example of a double-sided polishing machine. The machine has an annular upper carrier disk 12 as well as an also annular lower carrier disk 14 arranged opposite the upper carrier disk 12. An annular upper work disk 16 and an annular lower work disk 18 are held on the upper and lower carrier disk 12, 14. The work disks 16, 18 each have an annular work surface 20, 22, which amongst themselves border an also annular work gap 24. At least one of the carrier disks 12, 14 is thereby connected with a drive that is not shown in greater detail here, with which the carrier disk 12, 14 and thus the work disk 16, 18 assigned to it can be rotatingly driven around the rotational axis shown in FIG. 1 with 25. In particular, the carrier disks and thus the work disks can rotate in the opposite direction. In the present example, several not shown but generally known rotor disks, which are also rotated via a geared ring arrangement during a rotation of the work disks, are arranged in the work gap 24. They each have recesses for workpieces, for example wafers, to be machined in the work gap 24. Through the rotation of the rotor disks, the therein received wafers are thereby moved along cycloid paths in the work gap 24. For the machining, the work disks 16, 18 rotating relative to each other are pressed against each other with a pressing force and the workpieces held swimmingly in the rotor disks are machined, for example polished, on both sides between the work disks 16, 18. The work surfaces 20, 22 of the work disks 16, 18 can be provided for this with suitable work coatings, for example polishing coatings.

In the upper work disk 16, two distance sensors 26, 28, here eddy current sensors 26, 28, are arranged at two radially spaced locations, which measure the distance between the upper work disk 16 and the lower work disk 18, in particular the distance between the work surfaces 20, 22. FIG. 1 also shows different radii, such as radius $R_i$ of the inner edge of the work gap 24, radius $R_a$ of the outer edge of the work gap 24 and radii $R_1$ and $R_2$, which show the radial positions of the eddy current sensors 26, 28. According to the invention, a distance at any other radial position of the work gap 24 can be calculated for example from the distances between the work disks 16, 18 measured with the eddy current sensors 26, 28, for example at the inner edge of the work gap with the radius $R_i$ or at the outer edge of the work gap with the radius $R_a$. However, for example the distance between the work disks 16, 18 can also be determined at a radial location, the radius of which is the average value of the radii $R_a$ and $R_i$. This location will thus lie in the radial direction between the radii $R_a$ and $R_i$. The workpiece thickness can then be determined from the thus calculated distances. In particular, the respectively determined distances can be applied directly as workpiece thickness, if applicable by subtracting a work coating thickness.

Figure 2:
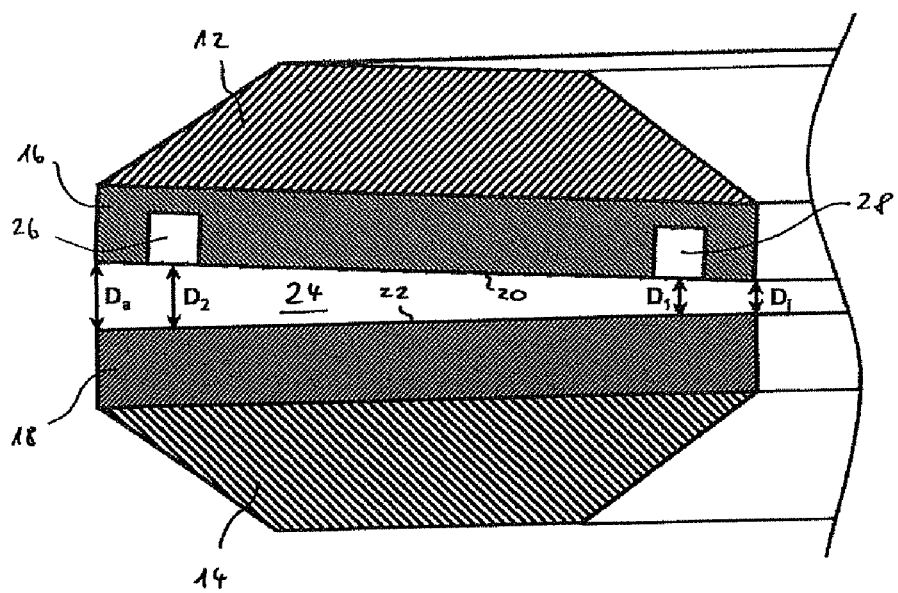
FIG. 2 an enlarged section of the double-sided machining tool from FIG. 1, FIG. 3 the section from FIG. 2 in another representation, FIG. 4 a diagram with a variable representing the radial probability of presence of a workpiece in the work gap, and FIG. 5 a diagram with a temporal characteristic of a work disk distance representing the workpiece thickness during the machining.
Figure 3:
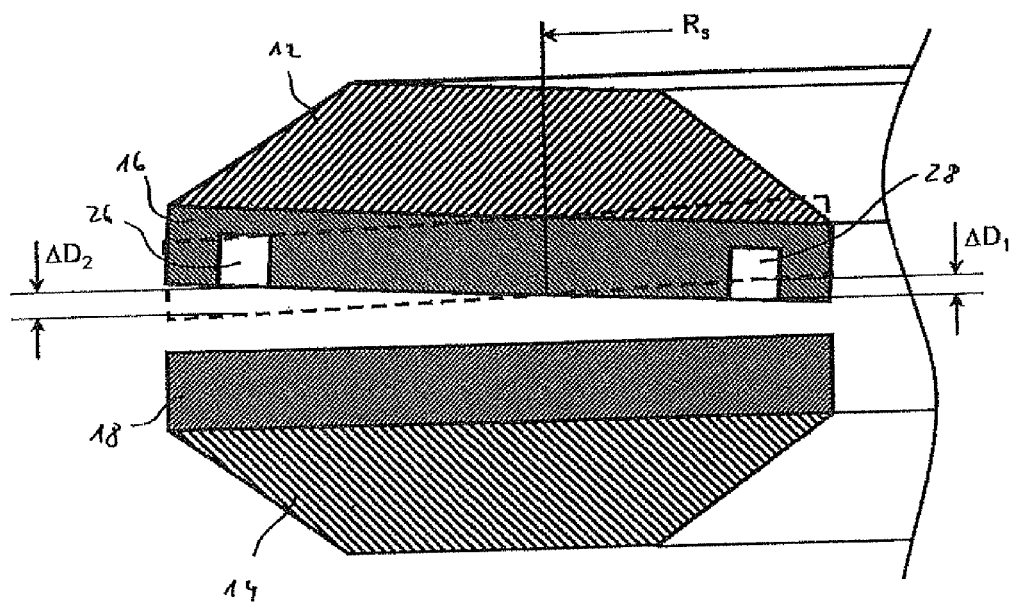

The double-sided machining tool shown in the figures is provided with an adjustment device (not shown), with which the upper carrier disk and with it the upper work disks 16 can be adjusted concavely or convexly. FIGS. 2 and 3 show an enlarged section of a convex adjustment of the upper carrier and work disk 12, 16. It can thereby be seen that the distance $D_i$ between the work disks 16, 18 on the inner work gap edge as well as the distance $D_a$ on the outer work gap edge and thus also the distances $D_1$ and $D_2$ measured by the eddy current sensors 26, 28 change accordingly. FIG. 3 shows with dashed lines a slightly concave position of the two work disks 16, 18 with respect to each other. It can be seen that the two eddy current sensors 26, 28 between the dashed concave position and the convex setting shown in FIGS. 2 and 3 measure different distance changes $\Delta D_1$ and $\Delta D_2$. It can also be seen that no change in the distance occurs during an adjustment of the work gap at a radial position $R_s$. Thus, no change in the work gap width takes place at this pivot or rotation point of the upper work disk 16 in the case of a change in the gap geometry. This can be taken advantage of in that the distance between the work disks 16, 18 at the radial position $R_s$ (determined for example previously within the framework of a calibration) is calculated from the measurement signals of the eddy current sensors 26, 28 and this distance is taken as the thickness of the workpieces machined in the workpiece in the work gap 24.

Figure 4:
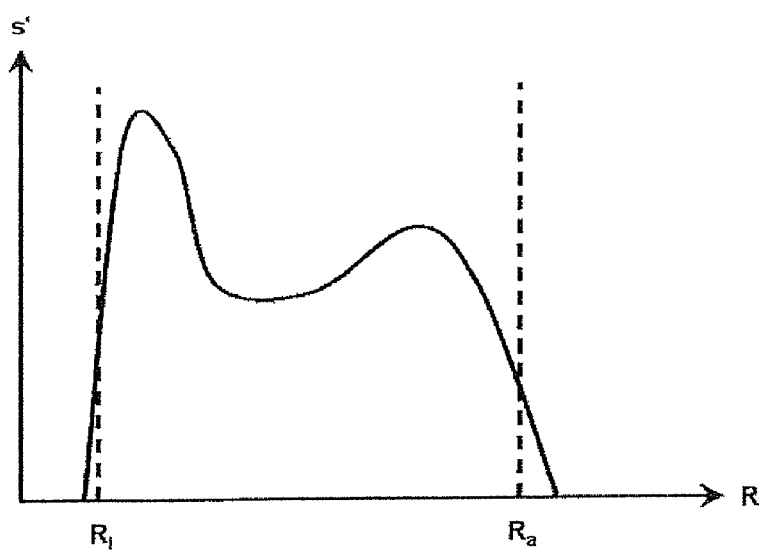

FIG. 4 shows a variable s' representing the radial probability of presence of the workpieces in the work gap 24, here the drawn path length distribution. The variable s' is shown over the radius R. The inner and outer radii $R_i$ and $R_a$ bordering the work gap 24 are shown with dashed lines. It can be seen that the workpieces stay increasingly in the range of the inner radius. This knowledge can be taken advantageous of in order to calculate the distance between the work disks for a plurality of for example evenly distributed radial positions from the measurement signals of the eddy current sensors 26, 28, to weight the respective distances with the variable s' applied in FIG. 4 specifying the radial probability of presence and to form from these weighted distances the arithmetic mean as actual workpiece thickness.

Figure 5:
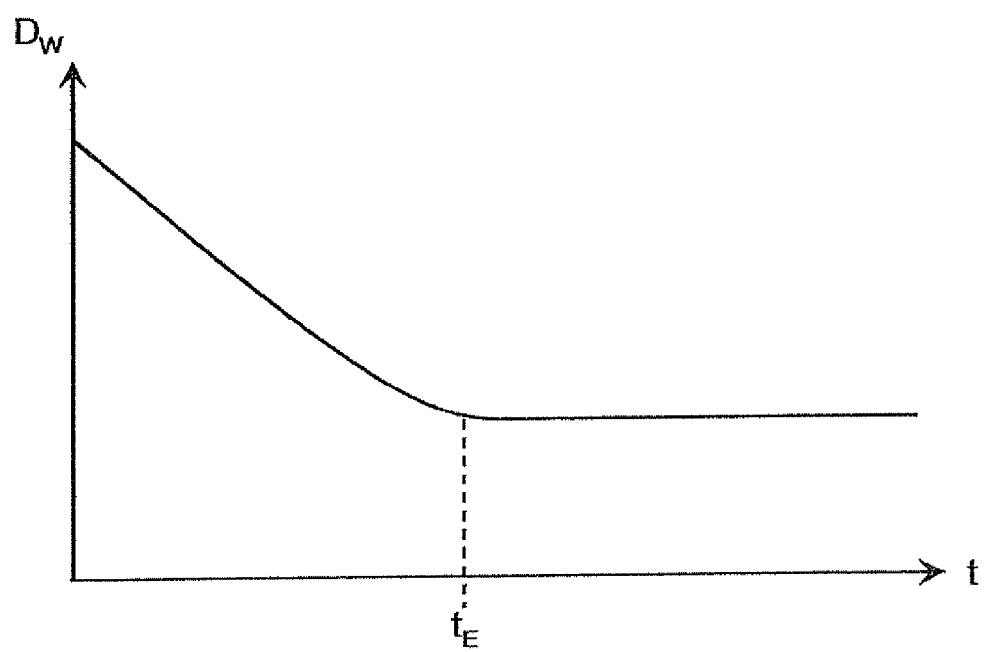

FIG. 5 shows a temporal characteristic of a certain work disk distance according to the invention at a radial location of the work gap, which represents the workpiece thickness during the processing. In particular, the work disk distance $D_w$ determined at a suitable radial location is applied over time t and the measurement points recorded at different times are combined to form the curve shown in FIG. 5. It can be seen that there are mainly two stable operating states. A largely constant material removal takes place before time $t_E$. A straight line with a constant negative slope results. Around time $t_E$, the workpieces machined in the work gap 24 reach the thickness of the rotor disks swimmingly receiving them. Accordingly, the material removal mainly comes to an end and the work disk distance and thus the workpiece thickness remain after time $t_E$ mainly at a constant value, i.e. a line with slope 0. The time $t_E$ can thus be selected as the end time for the machining. It can be determined in a simple manner in that the first mathematical derivation of the curve shown in FIG. 5 is calculated. As soon as they change significantly, if applicable above a threshold value hiding measurement fluctuations, the time $t_E$ is reached and the machining can be ended. In order to optimize the evenness of the workpieces and in particular of their surfaces, the machining process can also continue for a certain period beyond the time $t_E$. However, this leads to an increased wear of the rotor disks.

A precise machining of the workpieces to a predetermined thickness is possible in an easy manner with the method according to the invention.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method for machining flat workpieces in a double-sided machining tool, which has an upper and a lower work disk (16, 18), wherein at least one of the work disks (16, 18) is rotatingly driven about a rotation axis and the work disks (16, 18) each have an annular work surface (20, 22), wherein the work surfaces (20, 22) delimit between each other an annular work gap (24), wherein at least one carrier is located in the annular work gap, said carrier guides at least one workpiece in the work gap (24) so that the at least one workpiece is machined in a double-sided manner between the work surfaces (20, 22), the method comprising the steps of:

measuring the distance between the work disks (16, 18) at at least first and second measurement locations of the work gap (24), wherein the first and second measurement locations respectively define first and second radial lengths from the rotation axis, wherein the first and second radial lengths are not equal; and from these measured distances, a distance between the work disks (16, 18) is determined, via a calculation, at a third location of the work gap (24) representing the thickness of the at least one workpiece machined in the work gap (24), wherein this third location is a third radial length from the rotation axis, and the thickness of the at least one workpiece machined in the work gap (24) is determined from the distance derived in this manner, wherein the third radial length is not equal to the first or the second radial length, is less than or equal to a length from the rotation axis to an outer edge of the work gap (24), and is greater than or equal to a length from the rotation axis to an inner edge of the work gap (24).

2. The method according to claim 1, wherein the third length is equal to the length from the rotation axis to the outer edge of the work gap (24) or is equal to the length from the rotation axis to the inner edge of the work gap (24).

3. The method according to claim 1, wherein the third length corresponds to an average value of the length from the rotation axis to the outer edge of the work gap (24) and the length from the rotation axis to the inner edge of the work gap (24).

4. The method according to claim 1, wherein the work surface (20, 22) of at least one of the work disks (16, 18) can be changed into a convex or a concave shape and the distance between the work disks (16, 18) is determined from the measured distances at a location, defining the third length, at which the distance between the work disks (16, 18) does not change during a change of the work surface of the at least one work disk (16, 18) into a convex or a concave shape and the thickness of the at least one workpiece machined in the work gap (24) is determined from the thus determined distance.

5. The method according to claim 4, wherein the location at which the distance between the work disks (16, 18) does not change during a change of the work surface of the at least one work disk (16, 18) into a concave or a convex shape, is determined such that the work surface of the at least one work disk (16, 18) is adjusted into a concave and/or a convex shape, a change in the distance of the work disks (16, 18) at the measurement locations is measured, and therefrom the radius of the location is determined at which the distance between the work disks (16, 18) does not change during a change of the work surface of the at least one work disk (16, 18).

6. The method according to claim 1, wherein a distance between the work disks (16, 18) can be determined from the measured distances at a plurality of locations radially spaced from the measurement locations.

7. The method according claim 1 wherein the method is performed repeatedly, the workpiece thickness values are recorded over time, and an end time is determined for the workpiece machining from the recorded values of the workpiece thickness.

8. The method according to claim 7, wherein the end time is determined as the time when a first mathematical derivative of the recorded values changes by more than a predetermined threshold value.

9. The method according to claim 7, wherein the end time is determined as a time, which occurs after the time when a first derivative of the recorded values changes by more than a predetermined threshold value.

10. The method according to claim 1 wherein the distance at the respective measurement location is measured multiple times during one or more revolutions of the at least one rotatingly driven work disk (16, 18) and the average value of the measured distance values is determined and this average value is compared with a reference value.

11. The method according to claim 1 wherein the at least one carrier is at least one rotor disk, which has at least one recess, in which the at least one workpiece to be machined is received, and which is rotated by means of a roller device, whereby the at least one workpiece received in the rotor disk moves along a cycloid path in the work gap.

12. The method according to claim 1 wherein the distance between the work disks (16, 18) is measured with at least two eddy current sensors (26, 28) arranged in one of the work disks (16, 18) at first and second lengths from the rotation axis.

13. A method for machining flat workpieces, comprising the steps of:

providing a double-sided machining tool, which has an upper work disk and a lower work disk, wherein at least one of the upper and lower work disks is rotatingly driven about a rotation axis and the upper and lower work disks each have an annular work surface, wherein the work surfaces delimit between each other an annular work gap, wherein at least one carrier is located in the annular work gap, said carrier guides at least one workpiece in the work gap so that the at least one workpiece is machined in a double-sided manner between the work surfaces (20, 22), measuring the distance between the work disks at at least first and second measurement locations of the work gap, wherein the first and second measurement locations respectively define first and second radial lengths from the rotation axis, wherein the first and second radial lengths are not equal;

from these measured distances, a distance between the upper and lower work disks is determined via a calculation, at a third location of the work gap representing the thickness of the at least one workpiece machined in the work gap, wherein this third location is a third radial length from the rotation axis, wherein the third radial length is not equal to the first or the second radial length, is less than or equal to a length from the rotation axis to an outer edge of the work gap, and is greater than or equal to a length from the rotation axis to an inner edge of the work gap, and the thickness of the at least one workpiece machined in the work gap is derived from the distance derived at this location.

* * * * *